United States Patent [19]

Yoshida et al.

[11] Patent Number: 5,271,453
[45] Date of Patent: Dec. 21, 1993

[54] SYSTEM AND METHOD FOR CONTROLLING AIR CONDITIONER

[75] Inventors: Satoru Yoshida, Shimizu; Takashi Kato, Fujieda, both of Japan

[73] Assignee: Hitachi, Ltd., Tokyo, Japan

[21] Appl. No.: 893,030

[22] Filed: Jun. 3, 1992

[30] Foreign Application Priority Data

Jun. 6, 1991 [JP] Japan .................. 3-135099

[51] Int. Cl.⁵ .......................... G65D 23/00
[52] U.S. Cl. ......................... 165/22; 62/160; 236/51
[58] Field of Search ............... 236/51; 62/160; 165/22

[56] References Cited

U.S. PATENT DOCUMENTS

| 4,503,686 | 3/1985 | Moizumi | 236/51 X |
| 4,730,256 | 3/1988 | Niimi et al. | 364/431.12 |
| 4,829,779 | 5/1989 | Munson et al. | 236/51 X |

FOREIGN PATENT DOCUMENTS

| 0060893 | 9/1982 | European Pat. Off. | |
| 0179919 | 7/1986 | European Pat. Off. | |
| 0020305 | 2/1990 | Japan | 236/51 |
| 2-101342 | 4/1990 | Japan | |
| 2-110246 | 4/1990 | Japan | |

Primary Examiner—William E. Wayner
Attorney, Agent, or Firm—Antonelli, Terry, Stout & Kraus

[57] ABSTRACT

A system for sending programs for controlling an air conditioner, comprising at least one indoor unit and an outdoor unit connected to the indoor unit, the outdoor unit including a first memory for storing a program for controlling the room condition, a second memory for storing a program for controlling the outdoor unit in cooperation with the room condition control program, and a communication circuit for sending contents of the program in the memory to the indoor unit, the indoor unit including a third memory for storing a receiving execution program for executing the receiving of the room condition control program from the outdoor unit, a communication circuit for receiving the program from the outdoor unit, and a fourth memory for storing the program received. The third memory has stored therein the receiving program at an address at which the execution thereof is started when power is turned on. The control programs may be sent from the central control unit to the outdoor unit connected thereto and also to the indoor unit connected to the outdoor unit to implement control.

17 Claims, 7 Drawing Sheets

F I G. 1
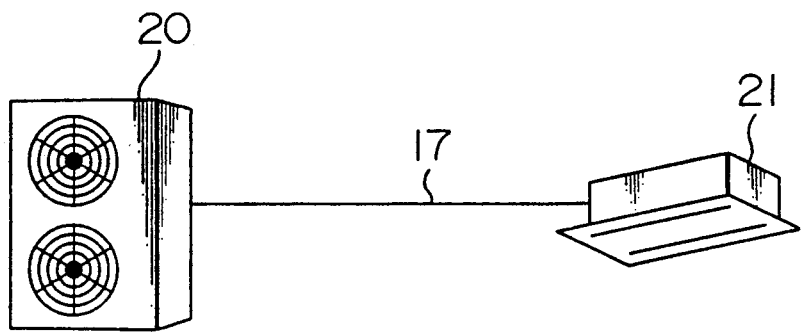
F I G. 2
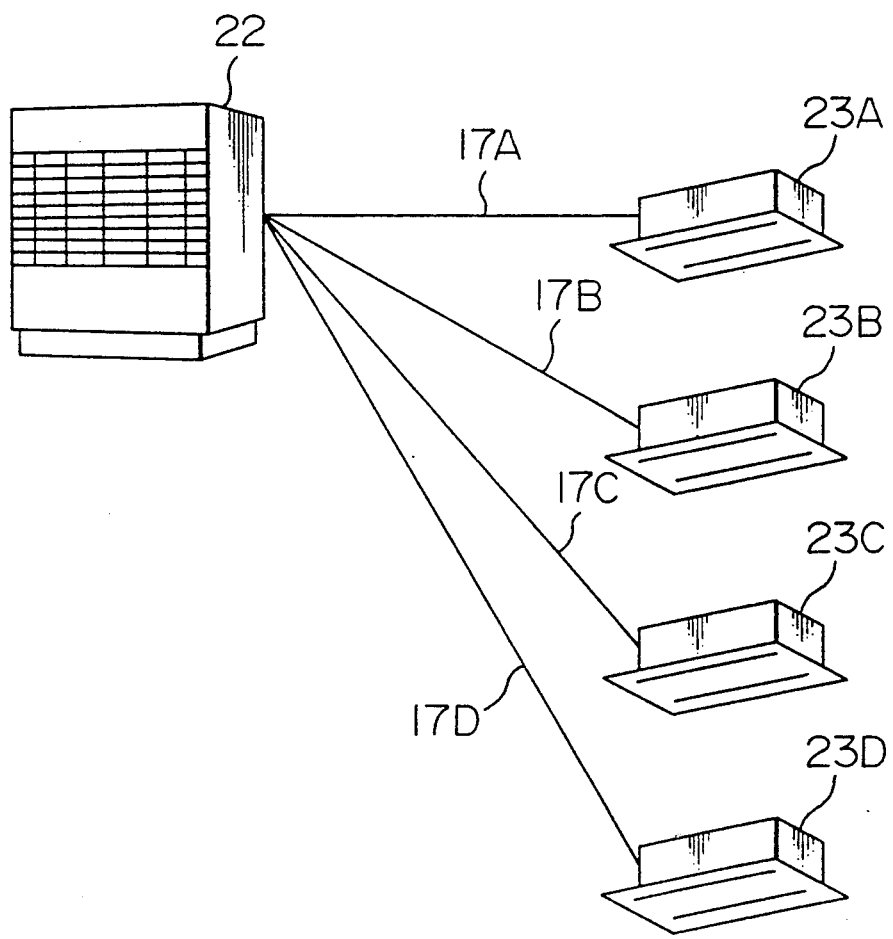

SYSTEM AND METHOD FOR CONTROLLING AIR CONDITIONER

BACKGROUND OF THE INVENTION

This invention relates to control of an air conditioner, and more particularly to a control system for an air conditioner suitable for controlling indoor units according to operation control programs supplied to the indoor units.

JP-A-Hei2-110246 and JP-A-Hei2-101342 each describe an air conditioner having indoor units and an outdoor unit which are connected.

In the control system of a conventional air conditioner, a control device containing a microcomputer is mounted in each of the outdoor and indoor units, and the operation of the air conditioner is controlled by exchanging control information through communication lines between the outdoor unit and the indoor units.

For example, in a single-type air conditioner comprising an outdoor unit 20 and an indoor unit 21 as shown in FIG. 1, a communication line 17 is used for connection between those units. In a multi-system air conditioner comprising one outdoor unit 22 and a plurality of indoor units 23A to 23D as shown in FIG. 2, a plurality of communication lines 17A to 17D are used for connection with the indoor units 23A to 23D.

Generally, in an air conditioner of this kind, operation programs prepared respectively for the outdoor and indoor units are written in their read only memories (hereafter referred to as ROM). Those ROMs are mounted on the printed circuit boards in the control devices of the outdoor and indoor units.

Among others, in a system in which respective ROMs having indoor and outdoor operation control programs written therein are mounted on the printed circuit boards in the control devices of the outdoor and indoor units, there is a problem as described below.

(a) If the range of program modification made to rectify program defects or for functional improvement extends over the outdoor unit side and the indoor unit side, the ROMs of the control devices on the outdoor and indoor unit sides need to be replaced with ROMs in which modifications have been made. Even if the range of program modification is limited to the indoor unit side, in contrast to a single-system air conditioner having only one indoor unit, in the case of a multi-system air conditioner, the printed circuit boards in the control devices of all the indoor units must be replaced, which require great amounts of work and expenses attending on the program modifications.

(b) Even when the whole system has been changed in a model change, even though the hardware of the indoor units is compatible with both the old and new systems, if the operation control program is not compatible with the old and new systems, the air conditioner cannot be operated by a combination of a new outdoor unit and old indoor units or a combination of an old outdoor unit and new indoor units.

(c) Even when the indoor-unit hardware is compatible with both a single-system air conditioner and a multi-system air conditioner, if the operation control program is not compatible with both systems, it is impossible to operate in combination a single-system outdoor unit and multi-system indoor units or a multi-system outdoor unit and a single-system indoor unit.

SUMMARY OF THE INVENTION

It is therefore an object of the present invention to provide a control system for an air conditioner which enables the operation control program of the indoor unit side control devices to be modified by making program modifications in the outdoor unit side control device.

Another object of the present invention is to provide a system capable of switching an indoor unit of one air conditioner system to an indoor unit of another air conditioner system.

A further object of the present invention is to provide an air conditioner system which satisfies the expected air-conditioning performance by changing the parts of the outdoor unit attending on a model change of an air conditioner.

Yet another object of the present invention is to provide a control system capable of rectifying an error in a control program with less labor and cost when an error is included in the control program.

A still further object of the present invention is to provide air conditioner system capable of transferring necessary air conditioning programs and performing an air conditioning operation when power is supplied to the indoor and outdoor units.

In order to achieve the above objects, in the control system of an air conditioner according to the present invention, including an outdoor unit side control device and an indoor unit side control device, for controlling the operation of the air conditioner according to control information exchanged through a communication line between the outdoor unit side control device and the indoor unit side control device, the improvement comprising outdoor unit memory means for storing an operation control program for use in the indoor control device and outdoor unit software means for sending an operation control program to the indoor control device through a communication line, the outdoor unit memory means and outdoor unit software means both being provided in the above-mentioned outdoor unit side control device, and indoor unit software means for receiving the operation control program sent from the outdoor unit software means and indoor unit memory means for storing the operation control program, the indoor unit software means and the indoor unit memory means for storing the operation control program both being provided in the indoor unit side control device.

Another possible arrangement of the control system of an air conditioner according to the present invention is as follows. In the control system of the air conditioner according to the present invention, which control system may have a plurality of outdoor unit side control devices and a plurality of indoor unit side control devices and a central control unit for controlling those outdoor unit and indoor unit side control devices, the central control unit may comprise non-volatile memory means for storing in advance operation control programs for use in the outdoor unit and indoor unit side control devices, and software means for sending the operation control programs through the communication lines to the outdoor unit and indoor unit side control devices.

The control system according to the present invention may be another structure comprising a non-volatile memory for storing in advance operation programs for a plurality of control devices, and software means for altering the operation control program.

Furthermore, a single chip microcomputer may be used for this air conditioner system, and this single chip microcomputer may comprise a ROM with expanded capacity or address space for writing therein an operation control program for the outdoor unit side control device, for example.

According to the control system of an air conditioner according to the present invention, on receiving a request to send the operation control program from the indoor unit side control device (indoor unit), the outdoor unit side control device (outdoor unit) reads the indoor unit operation control program from ROM 4 (outdoor unit memory means), and sends to the indoor control device through the outdoor unit software means. On the other hand, in the indoor unit side control device, a program loader (ROM) receives, through the indoor unit software means, the indoor unit operation control program sent from the outdoor unit side control device, and sequentially writes into RAM 12 (indoor memory means). At the completion of writing in RAM 12, the program loader passes control to CPU, and CPU starts to execute the indoor unit operation control program. Hereafter, the air conditioner can be operated by the indoor unit operation control program.

BRIEF DESCRIPTION OF THE DRAWINGS

FIG. 1 is a diagram showing a single-system air conditioner with a communication line attached thereto;

FIG. 2 is a diagram showing a multi-system air conditioner with communication lines attached thereto;

DESCRIPTION OF THE PREFERRED EMBODIMENTS

Figure 3:
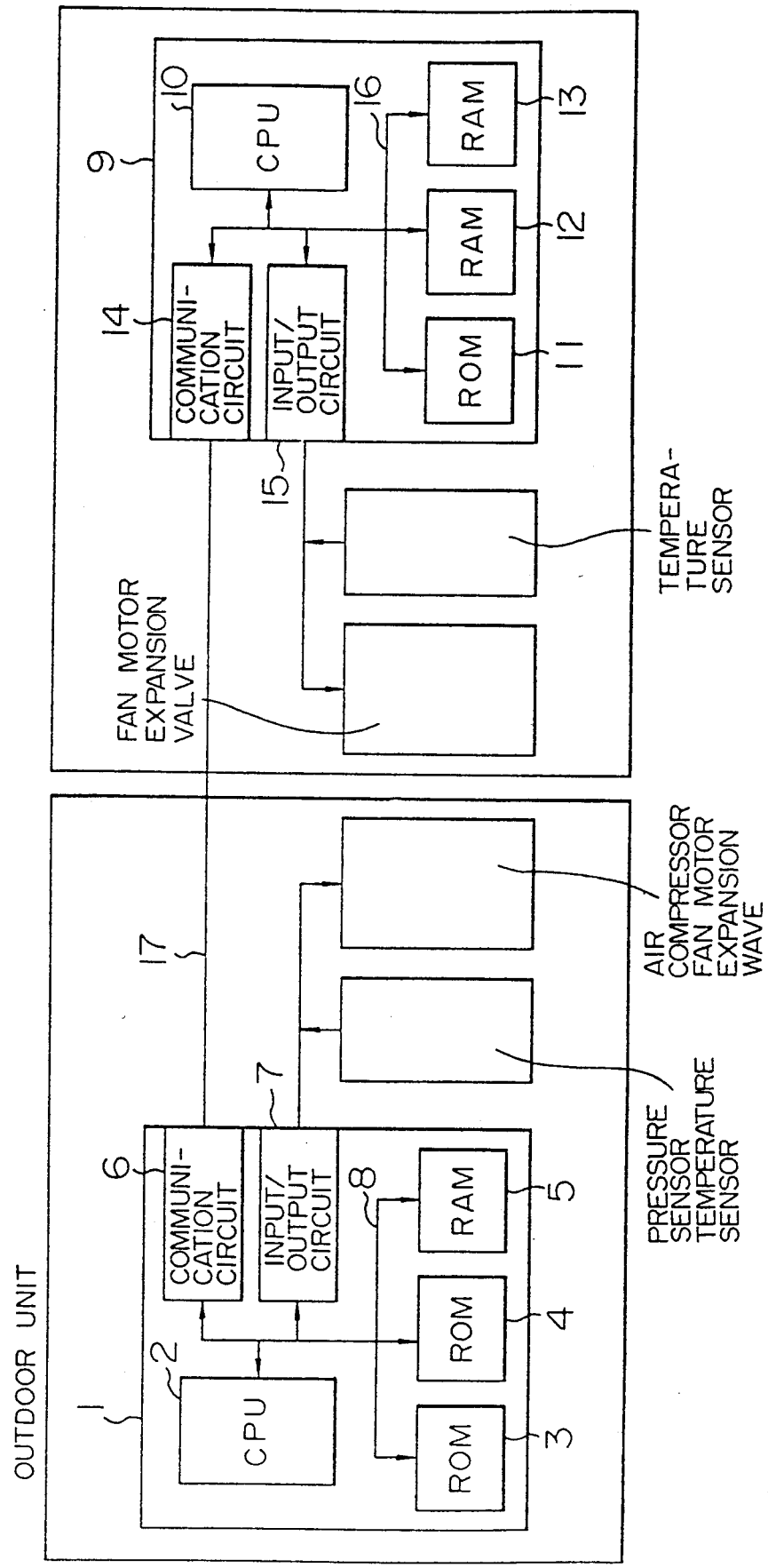
FIG. 3 is a block diagram of a first embodiment of the present invention.

FIG. 3 is a block diagram showing the control device as a first embodiment of the present invention. An indoor unit side control device, that is, a printed circuit board 1 comprises CPU 1, ROM 3 having an outdoor unit control program written therein, ROM 4, or outdoor unit memory means 4 having an indoor unit operation control program written therein, RAM 5 used as a working area for the outdoor unit control program, a communication circuit 6 for sending and receiving control signals to and from the indoor unit side control device or the indoor unit, an input/output circuit 7 for receiving a signal from sensors and sending a signal to an actuator, and a system bus 8. Outdoor unit software means includes CPU 2, ROM 3, and a communication circuit 6.

On the other hand, an indoor unit side control device or a printed circuit board 9 comprises CPU 10, ROM 11 having a program loader written therein, RAM or indoor unit memory unit 12 which is a read/write memory with a memory capacity for writing the whole of the indoor unit operation control program, RAM 13 used as a working area for the program loader and the indoor unit operation control program, a communication circuit 14 for sending and receiving control signals to and from the outdoor unit side control device or the indoor unit, an input/output circuit 15 for receiving a signal from a sensor and outputting a signal to an actuator, and a system bus 16. An indoor unit software means includes CPU 10, ROM 11, and a communication circuit 14.

The printed circuit boards 1 and 9 are connected with a communication line 17.

Figure 4:
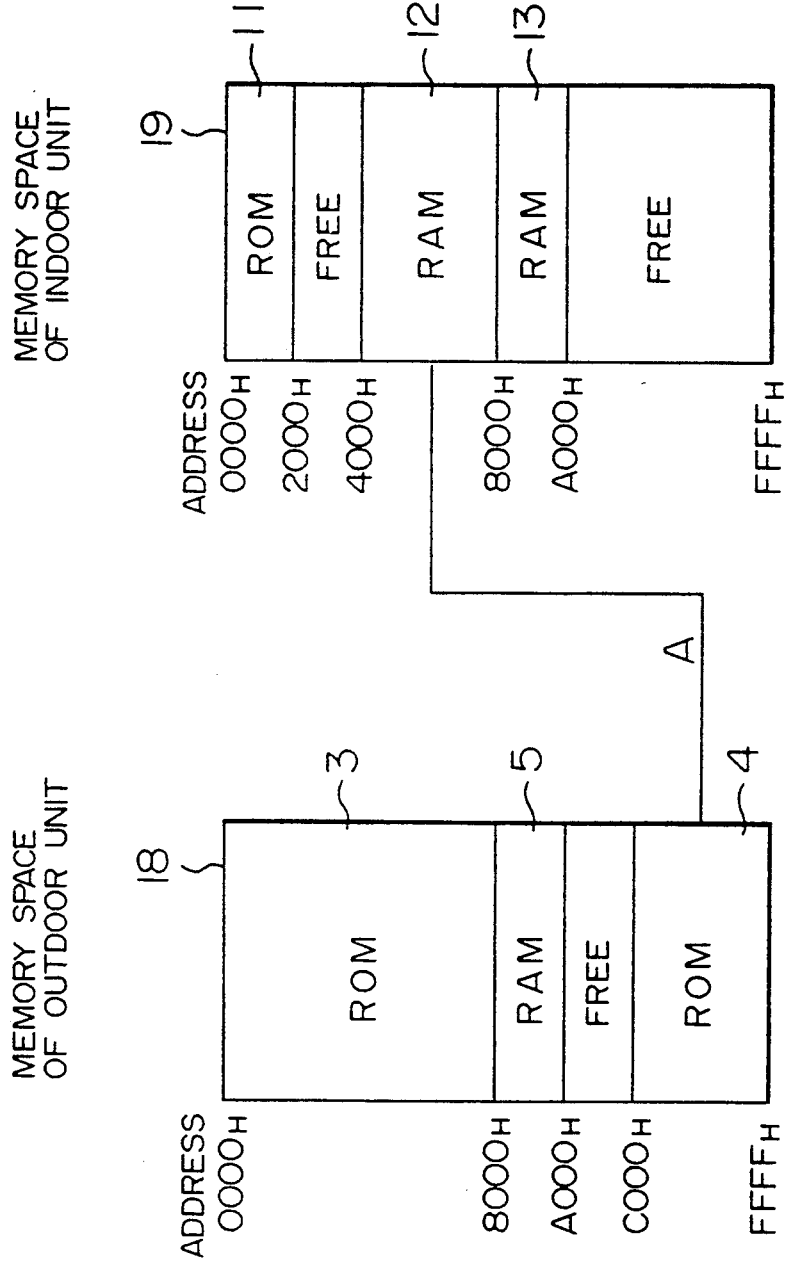
FIG. 4 is a diagram showing memory spaces of the first embodiment of the present invention.

FIG. 4 is a diagram showing memory spaces. A memory space 18 on a printed circuit board 1 of an outdoor unit, which is accessed by CPU 2, includes ROM 3 from address $0000_h$ to address $7FFF_h$, RAM 5 from address $8000_h$ to address $9FFF_h$, and ROM 4 from address $C000_h$ to address $FFFF_h$.

On the other hand, a memory space 19 on a printed circuit board 9 of an indoor unit, which is accessed by CPU 10, includes ROM 11 from address $0000_h$ to $1FFF_h$, RAM 12 from address $4000_h$ to address $7FFF_h$, and RAM 13 from address $8000_h$ to address $9FFF_h$.

Figure 5:
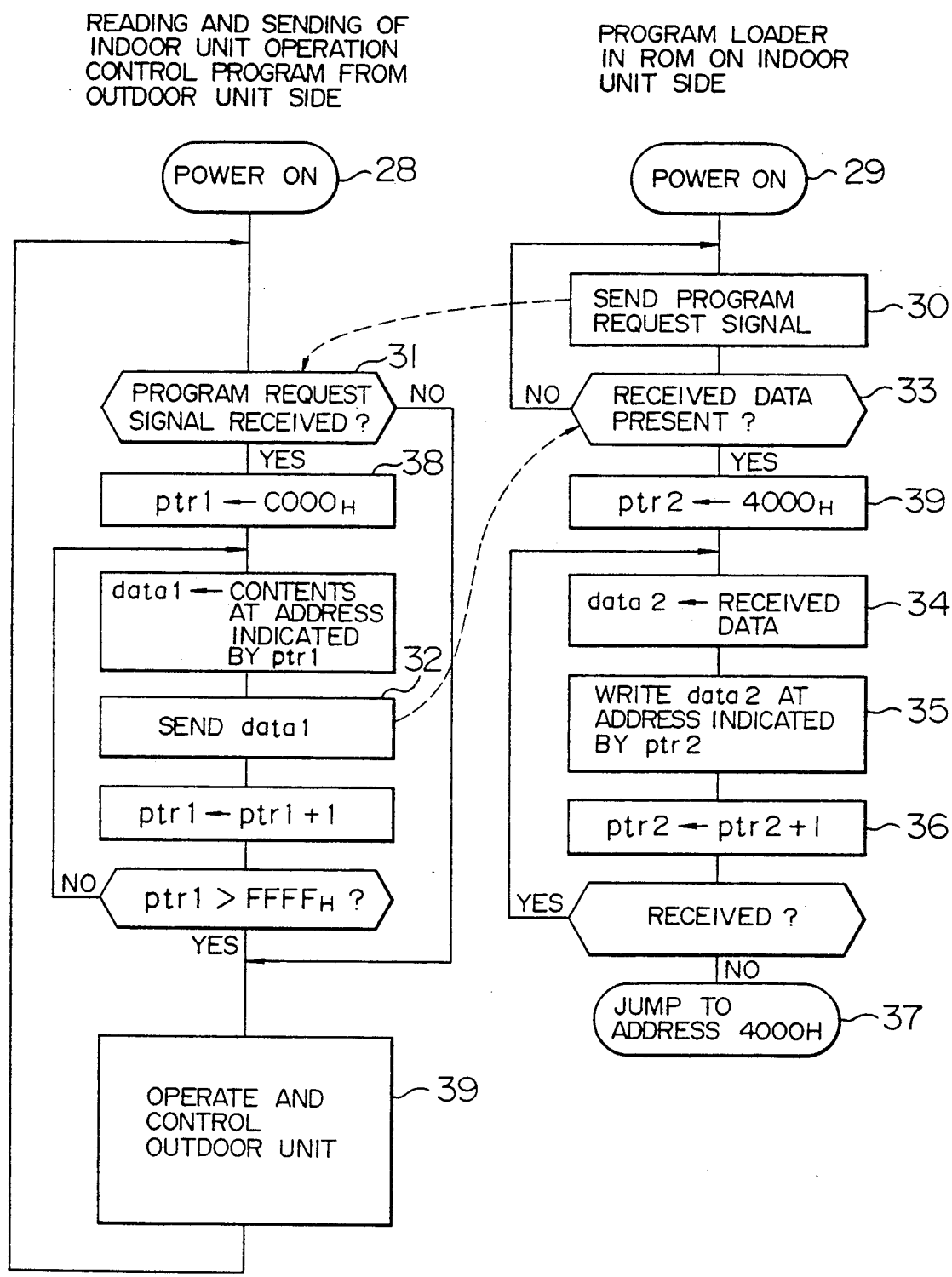
FIG. 5 is an operation flowchart for explaining the operation of the embodiment.

Referring to the flowchart in FIG. 5, description will now be made of the operation of the control system of an air conditioner constructed as described. When power is supplied to the printed circuit board 9 of the indoor unit (step 29 in the flowchart of FIG. 5), a well-known power supply clearing circuit, not shown, operates to clear the program counter, and the program loader written at address $0000_h$, that is, ROM 11 is executed by CPU 10. CPU 10 sends a program request signal to the printed circuit board 1 of the outdoor unit through a communication circuit 14. When power is supplied to the outdoor unit, the execution of the program on ROM 3 is started (step 28). When CPU 2 of the outdoor unit receives the program request signal through the communication circuit 6 (step 31), CPU 2 sequentially reads the operation control program for the indoor unit (step 34), and sends the program to the printed circuit board 9 of the indoor unit through the communication circuit 6. The addresses can be updated by using a well-known pointer as shown in the steps 38 and 39. When receiving the operation control program for the indoor unit through the communication circuit 14, CPU 10 of the indoor unit writes received data in RAM 12 sequentially (steps 35 and 36). By the above steps, the contents of ROM 4 of the outdoor unit are copied to RAM 12 of the indoor unit as indicated by the arrow A in FIG. 4. When said writing into RAM 12 has all been completed, CPU 10 terminates the execution of the program loader, and starts to execute the indoor unit operation control program written at address $4000_h$, that is, RAM 12 (step 37). By this, the indoor unit is made ready to operate.

As described above, ROM having the indoor unit operation control program written therein is mounted on the printed circuit board in the outdoor unit side control device. Even when the operation control program of the indoor unit is modified, the printed circuit board in the indoor unit side control device need not be replaced, but it is only necessary to replace the printed circuit board in the outdoor side control device.

So long as the indoor unit hardware is compatible with certain different air conditioner systems, among the outdoor units and indoor units belonging to those air conditioner systems, it is possible to form an inter-system combination of indoor and outdoor units and operate a thus formed air conditioner system. In this case, it is not necessary to replace any printed circuit board, because the air conditioner according to the present invention is so arranged that an operation control program is loaded into RAM of the indoor unit when power is supplied. According to this embodiment, a newly formed air conditioner can perform its function by the conventionally-structured hardware except that it is necessary to change the memory capacities of ROM and RAM (non-volatile memory). In this embodiment, ROM 3 and ROM 4 are arranged in the same address space. However, when the program size is larger than the memory capacity of ROM 3 and ROM 4 cannot be stored in the same address space, ROM 4 may be arranged in another address space so that the contents of ROM 4 can be read by bank switching.

A second embodiment of the present invention will now be described referring to FIGS. 6 to 8.

Figure 6:
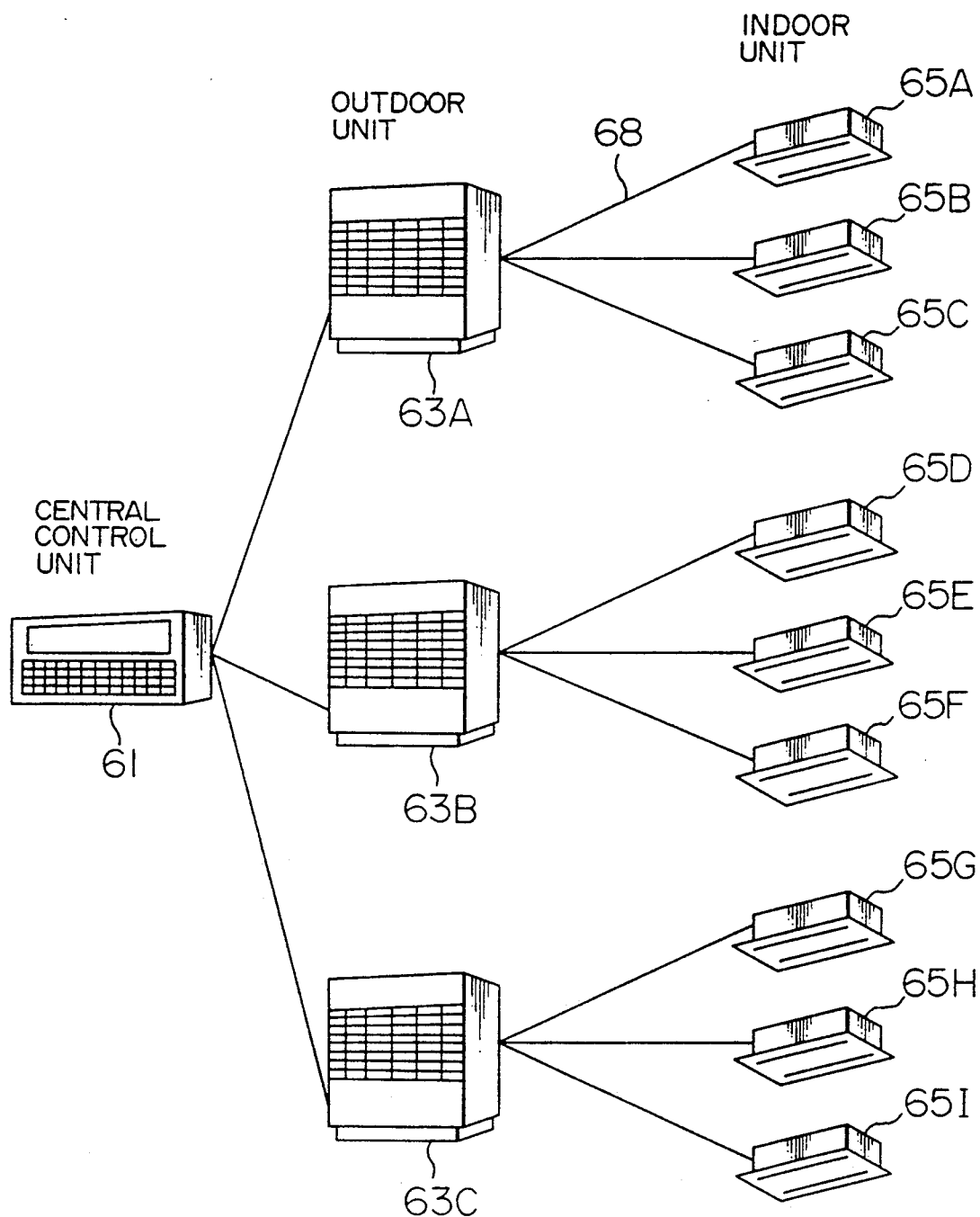
FIG. 6 is a diagram showing a second embodiment of the present invention with communication lines attached.
Figure 7:
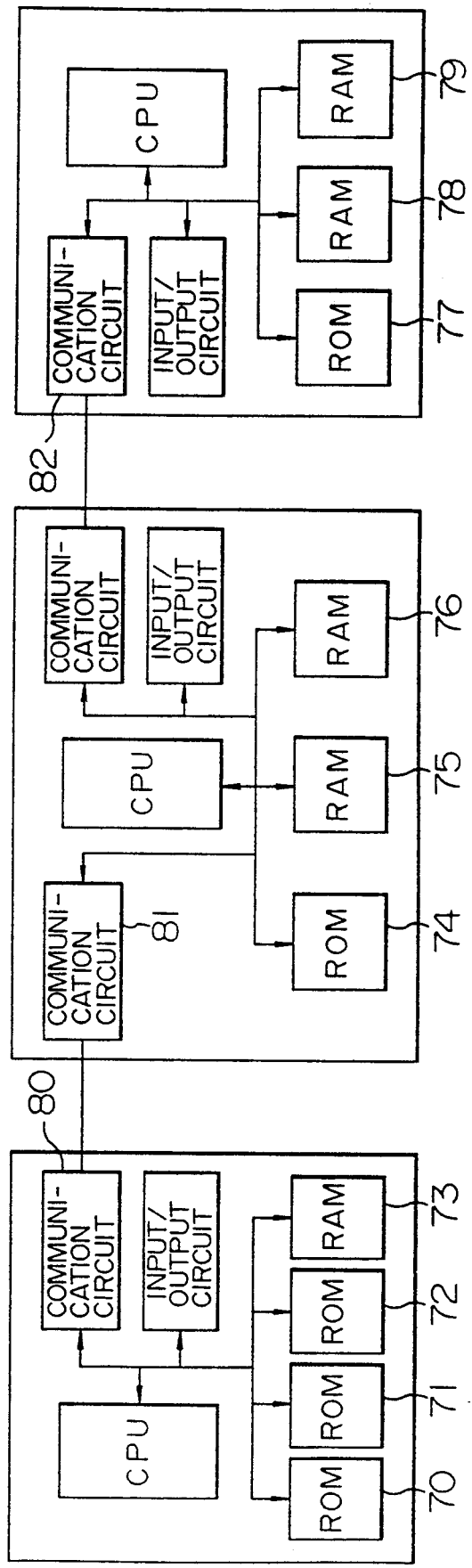
FIG. 7 is a block diagram showing the second embodiment of the present invention.

In an air conditioner system arranged so that a plurality of outdoor units can be controlled by a central control unit as shown in FIG. 6, the printed circuit board of the central control unit 61 includes ROM 71 having an outdoor operation control program written therein and ROM 72 having an indoor unit operation control program written therein as shown in FIG. 7. When power is supplied to the outdoor and indoor units, the contents of ROM 71 of the central control unit 61 are transferred to RAM 75 of the outdoor unit 63A as indicated by the arrow B in FIG. 8. Then, the contents of ROM 72 of the central control unit 61 are transferred to RAM 78 of the indoor unit 65A as indicated by the arrow C in FIG. 8. At the completion of data transfer to all indoor and outdoor units, the outdoor and indoor units become operable.

Figure 8:
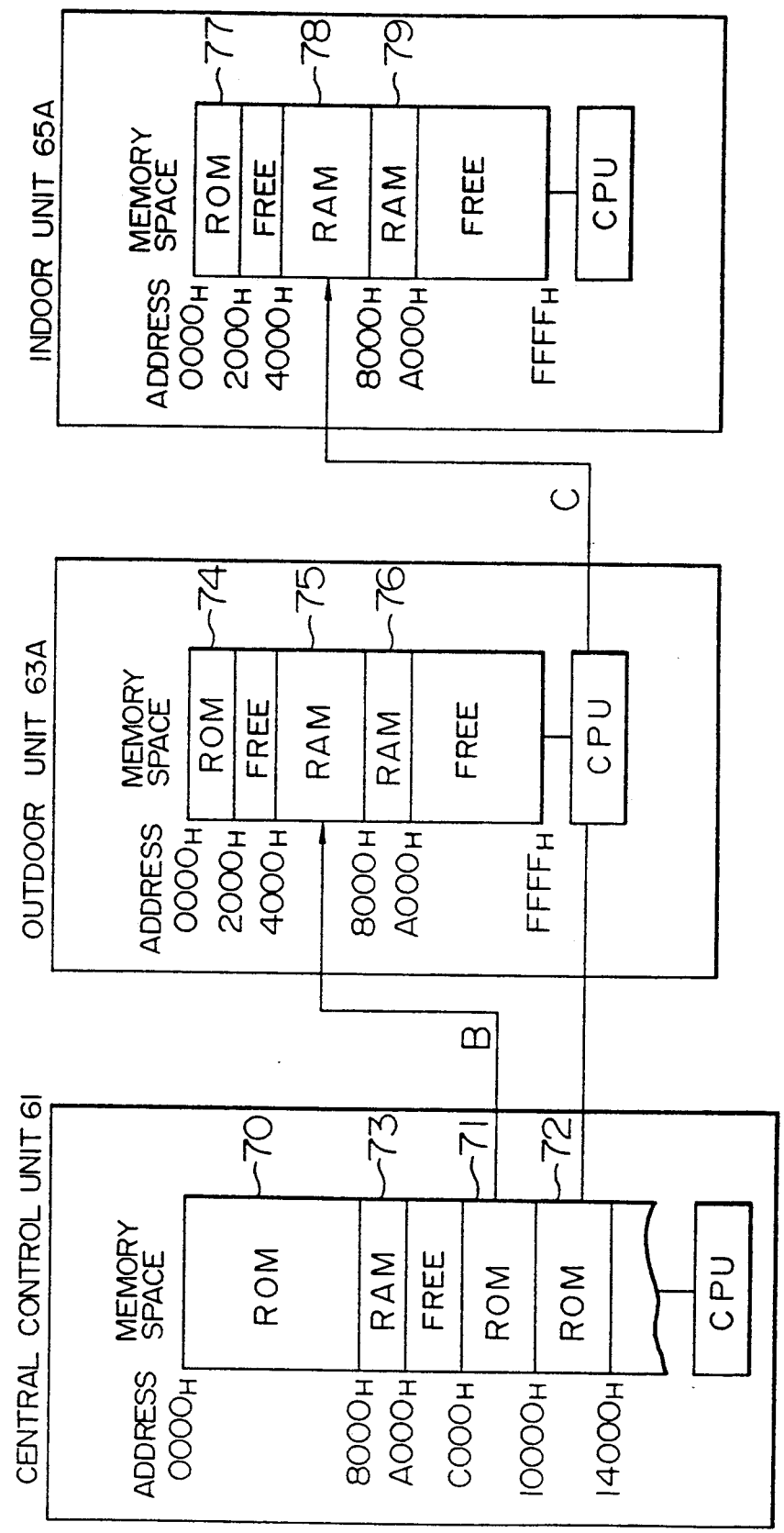
FIG. 8 is a diagram showing memory spaces of the second embodiment.

The signal lines 68, shown in FIG. 6, are used by the indoor and outdoor units for data transfer by use of the CPU of the outdoor unit indicated by the arrow C in FIG. 8. The connecting lines between the printed circuit boards of the central control unit, outdoor units and indoor units desirably further contain elements, a combination of a photo coupler and a buffer, for example, which prevent entry of noise into signals.

It will also be understood that the structure and function of other ROMs and RAMs are the same as were described with reference to the embodiment of FIG. 3.

It is possible to utilize a single chip microcomputer containing a ROM, a RAM, CPU, a part of a communication circuit, and an input/output circuit as connected in the similar manner, where this ROM has an expanded capacity or address space for writing in advance an operation control program for the outdoor unit side control device, for example.

In the above-mentioned embodiments, ROMs are used, but it will be understood easily that ROMs may be replaced by non-volatile read/write memories. Therefore, all of ROMs and RAMs may be replaced by non-volatile memories.

What is claimed is:

1. A system for sending programs for controlling an air conditioner, comprising:
   at least one indoor unit and an outdoor unit connected to said indoor unit, said outdoor unit including a first memory having a room condition control program stored therein, a second memory having stored therein a program for controlling said outdoor unit in cooperation with said room condition control program, and a communication circuit for sending contents of said memory to said indoor unit, and said indoor unit including a third memory 11 for storing a receiving execution program for executing the receiving of said room condition control program from said outdoor unit, a communication circuit for receiving said control program from said outdoor unit, and a fourth memory for storing said control program received.

2. A system according to claim 1, wherein said third memory has said receiving execution program stored at an address at which the execution thereof is started when power is turned on.

3. A system according to claim 1, wherein said receiving execution program stored in said third memory includes at the last step thereof an instruction for executing said receiving program stored in said fourth program.

4. A system according to claim 1, wherein said second memory contains a sending execution program for sending said room condition control program in response to said receiving execution program, the execution of said sending execution program being started when power is turned on, and subsequently, said sending execution program passes control to said outdoor unit control program for controlling said outdoor unit.

5. A system for sending programs for control of an air conditioner comprising at least one outdoor unit and a central control unit, said central control unit including a first memory having stored therein a program for controlling said outdoor unit, a second memory having stored therein a program for controlling said central control unit in cooperation with said control program, and a communication circuit for sending contents of the outdoor control program from said first memory, said outdoor unit including a third memory for storing a receiving execution program for executing the receiving of said outdoor unit control program from said central control unit, a communication circuit for receiving the programs from said central control unit, and a fourth memory for storing said outdoor unit control program received.

6. A system according to claim 5, further comprising at least one indoor unit connected to said outdoor unit, wherein said central control unit includes a fifth memory for storing a control program for controlling said at least one indoor unit, and wherein said indoor unit includes a sixth memory for storing a receiving execution program for executing the receiving of said room condition control program from the central control unit, a communication circuit for receiving the program from said central control unit, and a seventh memory for storing said control program received.

7. A system according to claim 6, wherein said sixth memory has stored therein said receiving executing program at an address at which the execution thereof is started when power is turned on.

8. A system according to claim 6, wherein said receiving execution program stored in said sixth memory has at the last step thereof an instruction for passing control to the received program stored in said seventh memory.

9. A system according to claim 6, wherein said second memory contains a sending execution program for executing sending in response to said receiving execution program, and wherein the execution of said sending execution program is started when power is turned on, and subsequently, said sending execution program passes control to said control program for controlling said central control unit.

10. A system according to claim 9, wherein said third and sixth memories each have means for sending a request signal for a program to said central control unit, and wherein said second memory includes means for deciding whether or not a program request signal from said third or sixth memory has reached the central control unit, and means for sending contents of said first or fifth memory to said fourth and seventh memory to said fourth and seventh memory when said request signal is received.

11. In a system including at least one indoor unit and an outdoor unit connected to said indoor unit, a method for sending a program for controlling an air conditioner comprising the steps of:

storing in said outdoor unit a program for controlling the room condition and a program for controlling said outdoor unit in cooperation with said room condition control program;

storing a receiving execution program for executing the receiving of said room condition control program from said outdoor unit; and storing the control program received from said outdoor unit.

12. A method according to claim 11, further comprising the step of storing said program for executing said receiving at an address at which the execution thereof is started when power is turned on.

13. A method according to claim 11, further comprising the steps of storing a sending execution program for executing the sending of said room condition control program in response to said receiving execution program, said sending execution program being started when power is turned on, and passing control to said control program for controlling said outdoor unit after said sending was executed by said sending execution program.

14. A method for sending a program for controlling an air conditioner according to claim 11, wherein said system comprises a non-volatile memory for storing therein in advance an operation program for a plurality of control devices, and software means for altering the operation control program.

15. A method for sending a program for controlling an air conditioner according to claim 11, wherein said system includes a ROM having expanded capacity or address space for writing therein in advance an operation control program for said outdoor unit side control unit.

16. In the control system of an air conditioner according to the present invention, including an outdoor unit side control device and an indoor unit side control device, for controlling the operation of the air conditioner according to control information exchanged between the outdoor unit side control device and the indoor unit side control device through a communication line, the improvement comprising outdoor unit memory means for storing an operation control program for use in the indoor control device and outdoor unit software means for sending an operation control program to the indoor control device through a communication line, the outdoor unit memory means and outdoor unit software means both being provided in the above-mentioned outdoor unit side control device, and indoor unit software means for receiving the operation control program sent from the outdoor unit software means and indoor unit memory means for storing the operation control program, the indoor unit software means and the indoor unit memory means for storing the operation control program both being provided in the indoor unit side control device.

17. In the control system of the air conditioner, including a plurality of outdoor unit side control devices and a plurality of indoor unit side control devices and a central control unit for controlling those outdoor unit and indoor unit side control devices, the central control unit comprises non-volatile memory means for storing therein in advance operation control programs for use in the outdoor unit and indoor unit side control devices, and software means for sending the operation control programs through the communication lines to the outdoor unit and indoor unit side control devices.

* * * * *